United States Patent
Nuesch et al.

(10) Patent No.: US 11,220,264 B2
(45) Date of Patent: Jan. 11, 2022

(54) SYSTEMS AND METHODS FOR MANAGING A SCOOTER FLEET BASED ON GEOLOCATION

(71) Applicant: Ford Global Technologies, LLC, Dearborn, MI (US)

(72) Inventors: Sandro Nuesch, Ann Arbor, MI (US); Mathew Boesch, Plymouth, MI (US); Ahsan Qamar, Canton, MI (US); Anita Stoffer, Rochester Hills, MI (US); Anthony Tsakiris, Beverly Hills, MI (US); Rashmi Hegde, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 257 days.

(21) Appl. No.: 16/534,977

(22) Filed: Aug. 7, 2019

(65) Prior Publication Data
US 2021/0039642 A1 Feb. 11, 2021

(51) Int. Cl.
*H04W 4/021* (2018.01)
*B60W 30/18* (2012.01)
(Continued)

(52) U.S. Cl.
CPC ............ *B60W 30/18* (2013.01); *B60W 50/14* (2013.01); *G01C 21/26* (2013.01); *G05B 19/042* (2013.01);
(Continued)

(58) Field of Classification Search
CPC ........ A61B 2090/365; B60K 2370/177; G05B 2219/39451; G05B 2219/39449;
(Continued)

(56) References Cited

U.S. PATENT DOCUMENTS 9,014,888 B2  4/2015  Sukkarié et al.
10,219,136 B2 * 2/2019 Hannah .................. G06Q 50/30
(Continued)

FOREIGN PATENT DOCUMENTS

WO   2017/217936 A1  12/2017

OTHER PUBLICATIONS

Dzewaltowski, P. (2018). Shared Mobility Pilot Program Request for Applications. Application Materials for the Mobility Division, Planning and Community Development. Santa Monica, CA (109 pages).
(Continued)

*Primary Examiner* — Christian Chace
*Assistant Examiner* — Jordan S Fei
(74) *Attorney, Agent, or Firm* — Brandon Hicks; Eversheds Sutherland (US) LLP

(57) ABSTRACT

Systems and methods are provided herein for managing scooter fleets based on geolocation boundaries. In certain embodiments, individual scooters of the scooter fleet may be associated with geographical areas in which they are allowed to operate, and such areas may be defined by a geolocation boundary. The geographical areas may be provided to prevent scooters from being used and subsequently left in an undesirable location (for example, at an airport terminal or an area where crime is commonplace).

16 Claims, 6 Drawing Sheets

(51) Int. Cl.
*G05B 19/042* (2006.01)
*B60W 50/14* (2020.01)
*G01C 21/26* (2006.01)

(52) U.S. Cl.
CPC ...... *H04W 4/021* (2013.01); *B60W 2050/143* (2013.01); *B60W 2050/146* (2013.01); *B60W 2300/365* (2013.01); *G05B 2219/25252* (2013.01); *G05B 2219/25257* (2013.01); *G05B 2219/2637* (2013.01)

(58) Field of Classification Search
CPC ...... G05B 2219/32014; G06F 2111/18; G06K 9/00671; H04M 2203/359; H04N 2201/3245; B60W 2300/365; B60W 2300/36; B60Y 2200/126; B60Y 2200/12; B62K 2202/00; B62K 3/002; B60C 2200/10; B60D 2001/005; B60M 7/006; B62M 29/00; G06Q 30/0645; H04W 4/021

See application file for complete search history.

(56) References Cited

U.S. PATENT DOCUMENTS

| | | | |
|---|---|---|---|
| 2007/0045019 | A1* | 3/2007 | Carter .................. B60T 7/16 180/167 |
| 2016/0180721 | A1 | 6/2016 | Otulic |
| 2018/0350144 | A1* | 12/2018 | Rathod ............. G06Q 20/3276 |
| 2019/0383627 | A1* | 12/2019 | Nangeroni ........ B60W 50/0098 |
| 2020/0058065 | A1* | 2/2020 | VanderZanden ... G06Q 30/0645 |
| 2020/0132482 | A1* | 4/2020 | Beaurepaire ..... G08G 1/096827 |

OTHER PUBLICATIONS

JAS (Feb. 8, 2018). India's First AI-enabled, Cloud-Connected Scooter FLOW launched at INR 74,740 (6 pages). Retrieved from http://www.autonewspress.com/indias-first-ai-enabled-cloud-connected-scooter-flow-launched-inr-74740.

* cited by examiner

SYSTEMS AND METHODS FOR MANAGING A SCOOTER FLEET BASED ON GEOLOCATION

TECHNICAL FIELD

The present disclosure relates to systems and methods for managing a fleet of scooters, for example electric scooters, based on one or more defined geofence areas for the scooters.

BACKGROUND

Electric scooters are often used and subsequently deposited in undesirable areas. The present disclosure seeks to prevent this from happening by altering the functionality of the scooter once the scooter exceeds a defined geofence area. In some embodiments, an augmented reality display may also be provided to visually indicate the location of the geofence area associated with the scooter.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The disclosure is directed to, among other things, systems and methods for managing a scooter fleet based on geolocation. In certain embodiments, individual scooters of the scooter fleet may be associated with a geofence area. A geofence area may, in some instances, refer to a geographical region that has been established as desirable for a scooter to remain within. The geofence areas may be provided to prevent scooters from being used and subsequently left in an undesirable location (for example, at an airport terminal or an area where crime is common). The geofence area may also have an associated boundary line which may define the outer edges of the geofence area.

Figure 8:
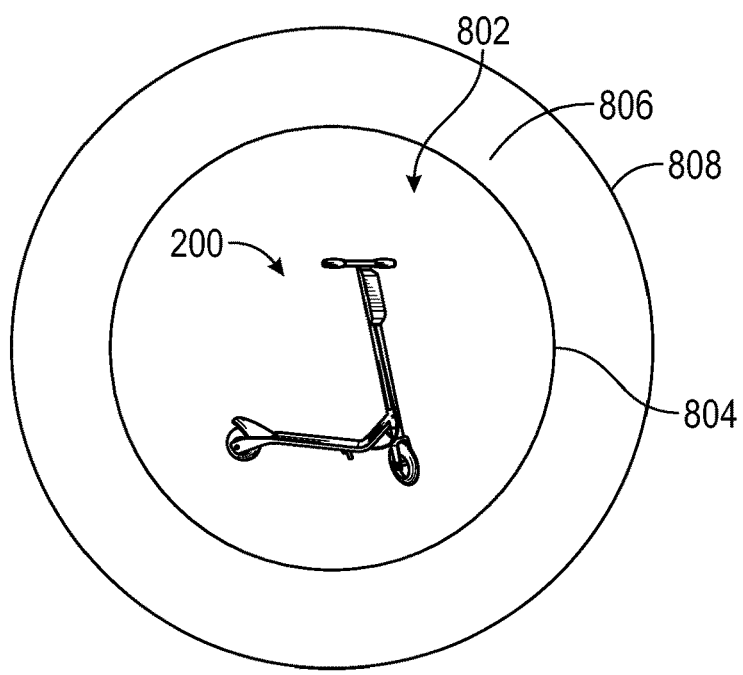
FIG. 8 depicts an example of a scooter associated with multiple geofence areas in accordance with one or more example embodiments of the disclosure.

In some embodiments, a scooter may be associated with multiple geofence areas (for example, as depicted in FIG. 8). The multiple geofence areas may be of varying size. For example, the scooter may be associated with a first geofence area of a first size, a second geofence area of a larger size, and so on. The first geofence area may be encompassed by, and/or located within, the larger second geofence area.

Figure 6:
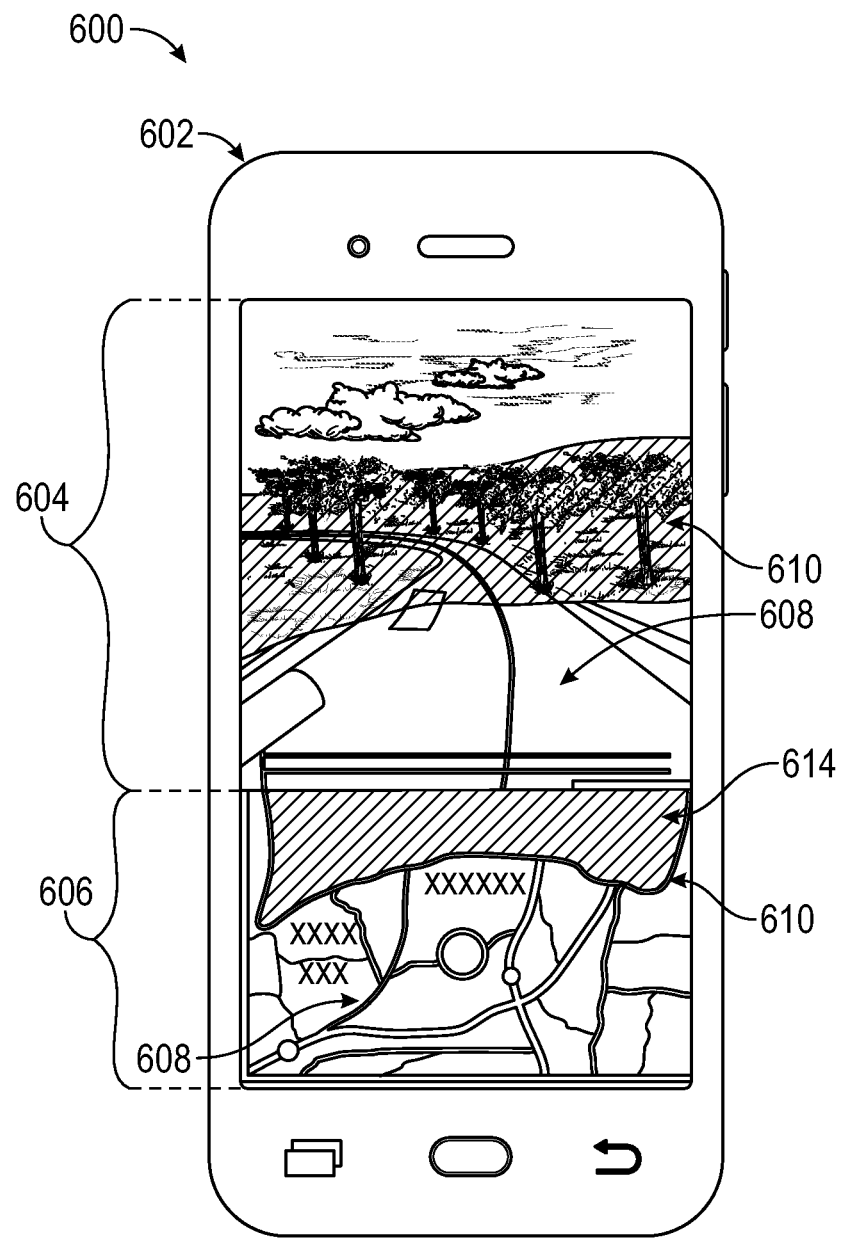
FIG. 6 depicts an example augmented reality map in accordance with one or more example embodiments of the disclosure.

In some embodiments, the geofence area in which an individual scooter is allowed to operate may be displayed to a user riding the scooter through an augmented reality map (for example, as depicted in FIG. 6). The augmented reality map may be displayed on the user's mobile device, which may be in communication with the scooter, and also may optionally be physically coupled to the scooter (for example, the handlebars may be configured to receive the user's mobile device). The augmented reality map may also be presented through a display on the scooter itself, or any other display that may be present.

In some embodiments, one or more actions may be triggered if the scooter exits the geofence area in which the scooter is allowed to operate. In some embodiments, the scooter may be associated with multiple geofence areas. In such embodiments, different actions may be triggered depending on the particular geofence area the scooter exits (for example, one type of action may be triggered if the scooter exits one geofence area, and another type of action may be triggered if the scooter exits another geofence area). The scooter exiting these different geofence areas may indicate that the scooter is traversing further away from a center point of a smallest geofence area. In some embodiments, a determination as to whether a scooter has exited the geofence area may be made by the scooter itself, on the cloud by a remote server, or by the user mobile device. For example, the scooter may provide Global Positioning System (GPS) updates to a cloud system, and the cloud system may then determine if the scooter is within its allowed geofence area based on the GPS updates. The cloud system may also use any number of other signal inputs, computer vision techniques, or other methods to determine whether the scooter is within its geofence. In some instances, the determination may also require the scooter to be beyond the geofence area for a threshold period of time before any subsequent action is taken. This threshold period of time may depend on a number of factors, such as the direction the scooter is traveling in.

In some embodiments, the one or more actions that are triggered when the scooter exits the geofence area may include the amount of propulsion assistance provided by the scooter being reduced. When the propulsion assistance reaches zero the user may still be able to manually push the scooter. However, the amount of resistance provided by the scooter may also be increased (for example, to make it more difficult for the user to manually push the scooter). Both the reduction in the amount of propulsion assistance and the increasing amount of resistance provided may happen gradually over time at varying rates (which may be different rates or the same rate). These rates may be dynamic and may depend on various factors, such as how far from the boundary line the scooter is and also on the direction the scooter is traveling (for example, some areas may be less desirable for a scooter to be left than others). Additionally, a notification may be provided to the user mobile device that indicates the scooter is outside the acceptable geofence area, and provides an amount of time remaining until the propulsion assistance is reduced to zero and the resistance is increased to a maximum amount.

In some embodiments, the one or more actions that are triggered when the scooter exits the geofence area may also include a physical change to a configuration of the scooter in order to make the scooter more difficult to ride. For example, a platform of the scooter on which the user may stand while riding the scooter may be tilted gradually over time. As another example, the handlebars of the scooter may tilt. As another example, the whole scooter, or individual components such as the handlebars, may vibrate. Any other physical change to a configuration of the scooter that has the impact of incentivizing the user to return to the boundary line is possible as well. The extent of the physical changes may also depend on various factors, such as how far from the boundary line the scooter is and also on the direction the scooter is traveling.

In some embodiments, the one or more actions that are triggered when the scooter exits the geofence area may also include providing an alert to the user. The alert may be in any form, for example, an audible alarm that may be heard from others in the vicinity, push notifications to the user's mobile device, a visual indication on the user's mobile device, etc. The alert may also be increased in intensity as the amount of time the scooter is outside the geofence area (or the distance the scooter is from the boundary line) increases. For example, the audible alarm may become increasingly louder.

In some embodiments, an optimal route back to the geofence area may be determined and provided to the user of the scooter. For example, the optimal route may be displayed on the user's mobile device through the augmented reality map.

In some embodiments, once the scooter is returned to the geofence area, the one or more actions that were triggered as a result of the scooter crossing the boundary line may be reversed, or otherwise ceased. For example, the alerts may cease, the physical changes to the configuration of the scooter may be reverted, and the propulsion assistance may be reintroduced.

In some embodiments where multiple geofence areas are associated with a scooter, any combination of these actions, or any other actions, may be triggered as the scooter exits successive geofence areas. For example, if the scooter exits a first smaller geofence area, the amount of propulsion assistance may be gradually reduced, and if the scooter exits a second larger geofence area (for example, a geofence area that encompasses the first geofence area), then the resistance provided by the scooter may gradually increase. Any number of other combinations of actions may be possible as well.

Illustrative Embodiments

Figure 1:
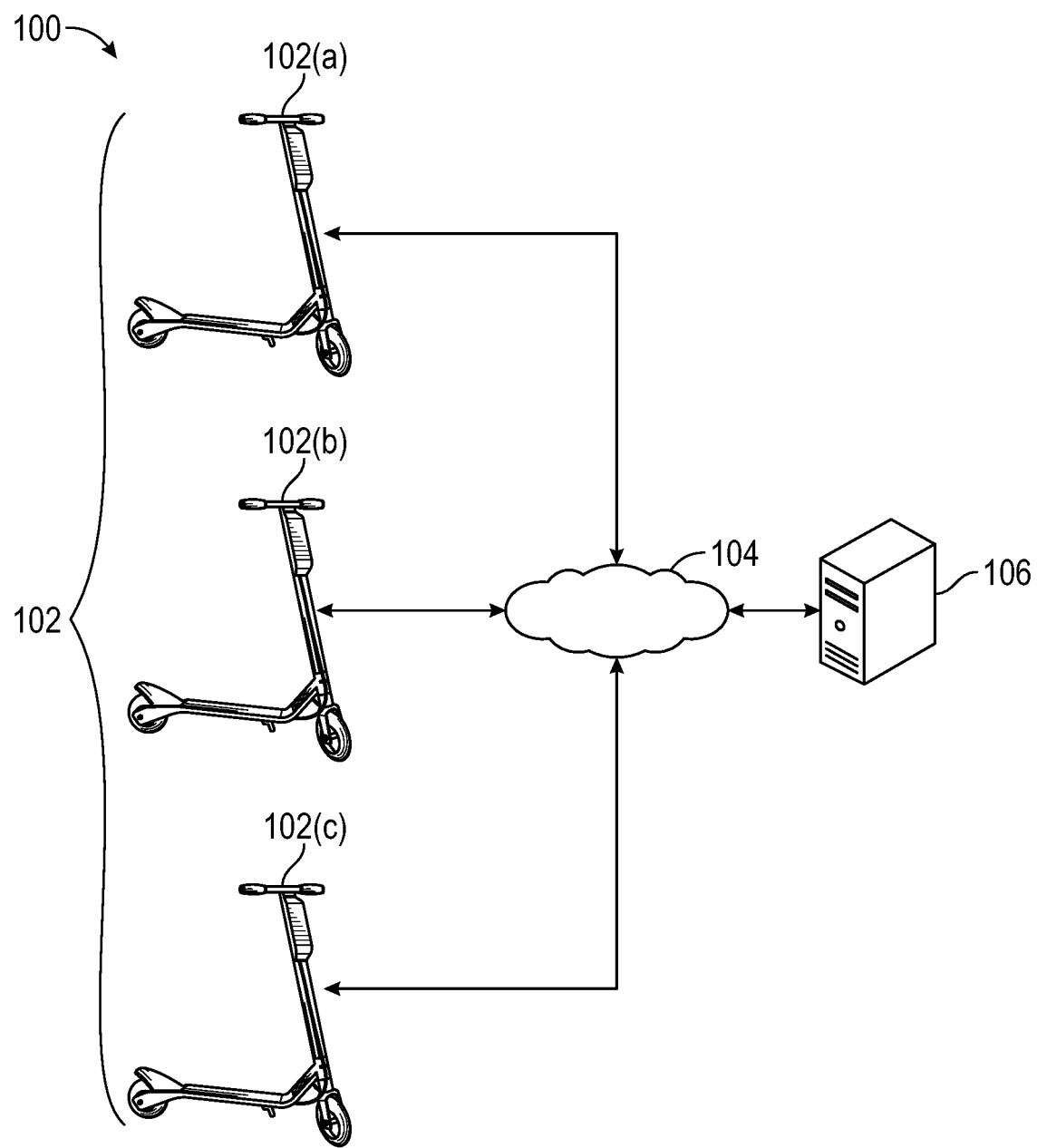
FIG. 1 depicts an illustrative architecture in accordance with one or more example embodiments of the disclosure.

Turning now to the drawings, FIG. 1 depicts an illustrative architecture 100 in which techniques and structures of the present disclosure may be implemented. The illustrative architecture 100 may include a scooter fleet network 102 comprising a plurality of scooters such as scooters 102(a), 102(b), and 102(c), a communications network 104, and a server 106. The communications network 104 may include any one or a combination of multiple different types of networks, such as cable networks, the Internet, wireless networks, and other private and/or public networks. In some instances, the communications network 104 may include cellular, Wi-Fi, or Wi-Fi direct. In some embodiments, the network may involve communications between the scooter in the network and/or between the scooter in the network and elements external to the network. For example, Vehicle-to-Vehicle (V2V), Vehicle-to-Infrastructure (V2I), Vehicle-to-Everything (V2X), and/or Dedicated Short Range Communications (DSRC), to name a few, may be used. In some embodiments, some functionalities disclosed herein can be executed by an individual scooter (e.g., 102(a)-102(c)) in the scooter fleet network 102. In other embodiments, some functionalities disclosed herein can be executed entirely by the scooter fleet network 102 as a whole. In other embodiments, some functionalities disclosed herein can be executed cooperatively by individual scooter and the scooter fleet network 102 as a whole. In other embodiments, some functionalities disclosed herein can be executed by an external source, such as server 106.

In some embodiments, server 106 may serve as an external data source for any of the scooters in the scooter fleet network 102. For example, the server 106 may contain information about geofence areas in which any of the various scooters (e.g., 102(a), 102(b), or 102(c)) may operate. The server 106 may also contain information relevant to the scooter, such as information about which directions beyond the geofence area will trigger faster actions, the types of actions to trigger, the rates associated with particular actions (for example, the rate of resistance increase in the scooter), and/or what actions to trigger depending on which geofence area a scooter exits (for example, if the scooter is associated with multiple geofence areas). In some embodiments, the server may also provide any of the control functionality described herein. For example, the server 106 may receive GPS updates from a scooter to determine whether the scooter is within its associated geofence area. The server 106 may then, upon determining that the scooter is outside its geofence area, provide commands to the scooter to initiate a physical change in its configuration (e.g., provide a tilt in the scooter's platform), cause the scooter to provide an alert, or any other function the scooter may perform as a result of the scooter crossing the boundary line. Any of the other functionality described herein, for example with reference to a scooter, may be performed by the server 106.

Figure 2:
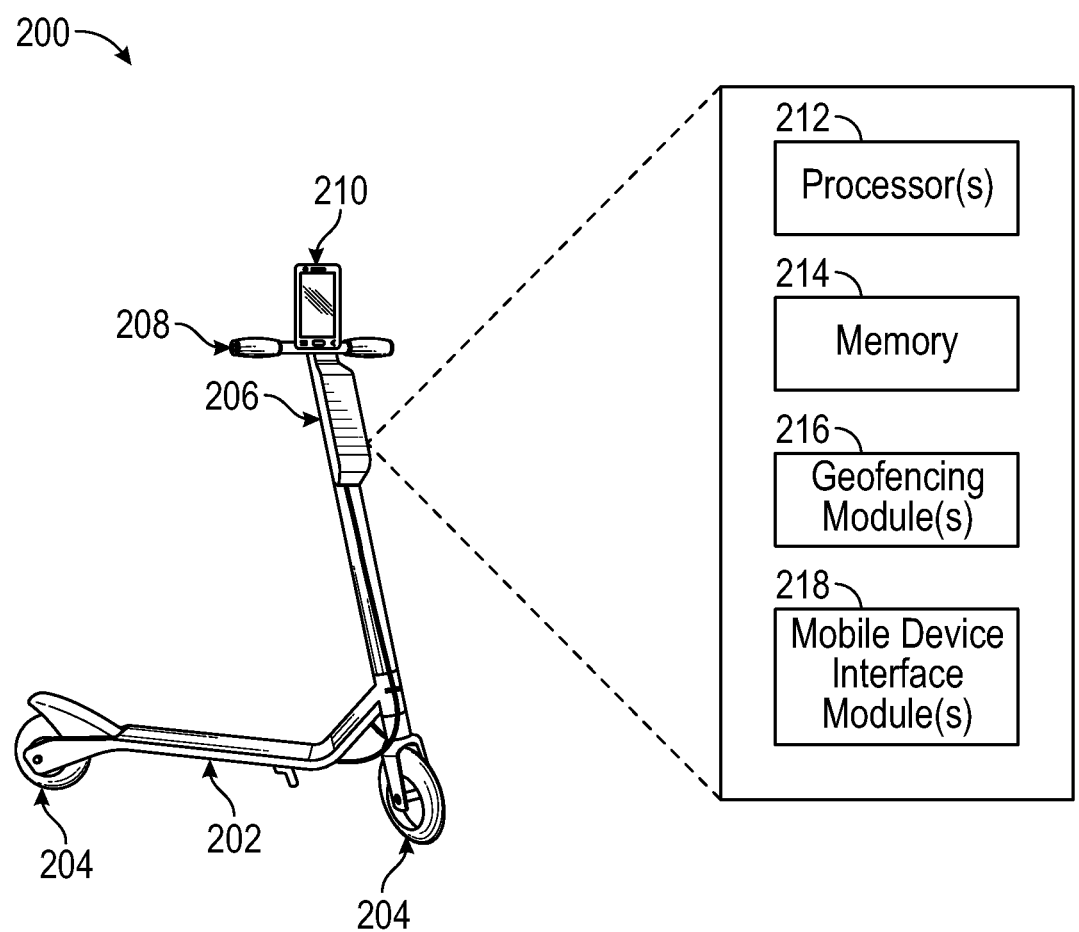
FIG. 2 depicts an example scooter in accordance with one or more example embodiments of the disclosure.

FIG. 2 depicts an example scooter 200 in accordance with one or more example embodiments of the disclosure. For example, scooter 200 may be any of the scooters (e.g., 102(a), 102(b), and/or 102(c)) of the scooter fleet network 102. In various embodiments, the scooter 200 comprises a platform 202, one or more wheels 204, a controller 206, handlebars 208, and may also optionally be in communication with a user mobile device 210. In some embodiments, the scooter 200 may be configured to receive the user mobile device 210 as an attachment (for example, the user mobile device 210 may be attached to the handlebars 208). The controller 206 of the scooter may comprise at least one or more processor(s) 212, memory 214, one or more geofencing module(s) 216, and one or more mobile device interface module(s) 218. In some embodiments, the functionality of the module(s) described herein (for example, the geofencing module(s) 216, one or more mobile device interface module(s) 218) may also be implemented as a single module or any other number of module(s).

In some embodiments, scooter 200 may include one or more processors 212 that may include any suitable processing unit capable of accepting digital data as input, processing the input data based on stored computer-executable instructions, and generating output data. The computer-executable instructions may be stored, for example, in data storage and may include, among other things, operating system software and application software. The computer-executable instructions may be retrieved from the data storage and loaded into the memory 214 as needed for execution. The processor 212 may be configured to execute the computer-executable instructions to cause various operations to be performed. Each processor 212 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The memory 214 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 214 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The geofencing module(s) 216 may perform operations including at least determine a geofence area associated with a first scooter of the one or more scooters; generate an augmented reality map, wherein the augmented reality map includes an indication of the geofence area associated with the first scooter; determine that the first scooter has exited the geofence area; and instruct, based on the determination that the first scooter has exited the geofence area, a physical change to a configuration of the first scooter in order to make the first scooter more difficult to ride. The geofencing module 216 may also be responsible for any other functionality associated with the scooter 200, such as providing instructions to perform actions triggered based on the scooter 200 exiting the geofence area, providing GPS updated to the server 106, or any other relevant functionality.

The mobile device interface module(s) 218 may serve to facilitate communications between the controller 206 and the user mobile device 210. In some embodiments, the mobile device interface module 218 may provide an augmented reality map (for example, as shown in FIG. 6) to the user mobile device 210. The augmented reality map may serve as a visual indicator of the geofence area in which the scooter 200 is allowed to operate.

Figure 3:
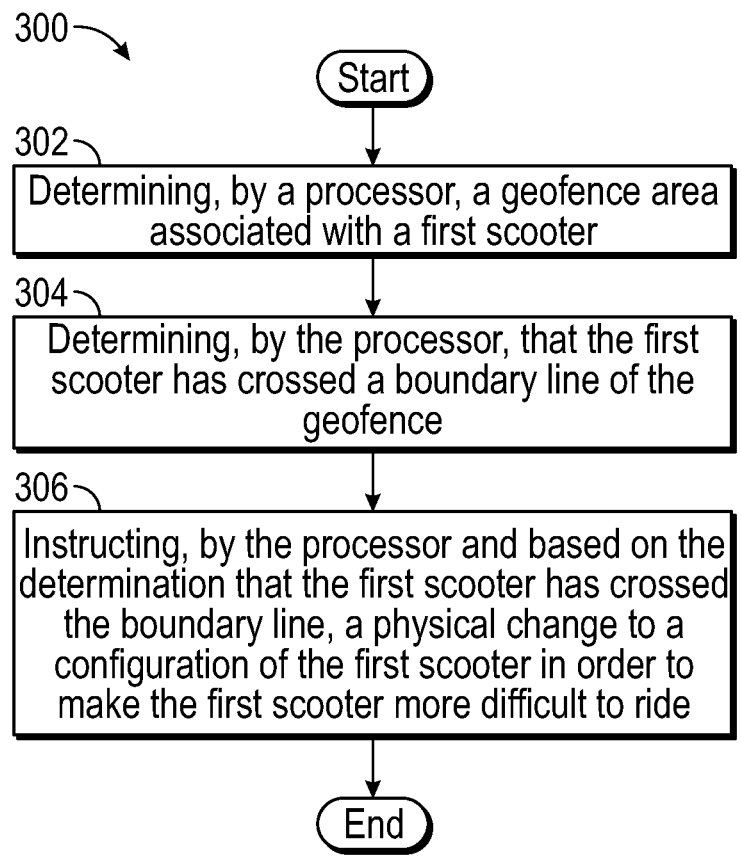
FIG. 3 depicts a flowchart of an example method in accordance with one or more example embodiments of the disclosure.

FIG. 3 is a flowchart of an example method of the present disclosure. In some embodiments, the method includes a step 302 of determining, by a processor, a geofence area associated with the first scooter. In some embodiments, the determination may be made by the controller 206 of the scooter 200. In some embodiments, the determination may be made by the user mobile device 210 that is in communication with the scooter 200. In some embodiments, the determination may be made by the server 106, or any other source. The geofence area may refer to a geographical region in which the scooter 200 is allowed to operate.

In some embodiments, the method includes a step 304 of determining, by the processor, that the first scooter has exited the geofence area. For example, the boundary line may represent the outer edge of the geographical area in which the scooter is allowed to operate. The boundary line may be displayed to a user of a scooter 200 through an augmented reality user interface (for example, as depicted in FIG. 6).

In some embodiments, the method includes a step 306 of instructing, by the processor and based on the determination that the first scooter has exited the geofence area, a physical change to a configuration of the first scooter in order to make the first scooter more difficult to ride. The physical change, for example, may involve a tilt of the platform of the scooter 200. The tilt may gradually increase over time, and the rate of tilt may depend on how far the scooter 200 is from the boundary line and/or the direction that the scooter 200 is traveling. As another example, the handlebars may tilt. As another example, the whole scooter, or individual components such as the handlebars, may vibrate. Any other physical change to a configuration of the scooter that has the impact of incentivizing the user to return to the boundary line is possible as well. In some embodiments, instructions may also be provided to perform any of the other functionalities described herein, such as causing the scooter to provide an alert, causing the scooter to adjust its amount of propulsion assistance, or causing the scooter to increase the amount of resistance provided.

Figure 4:
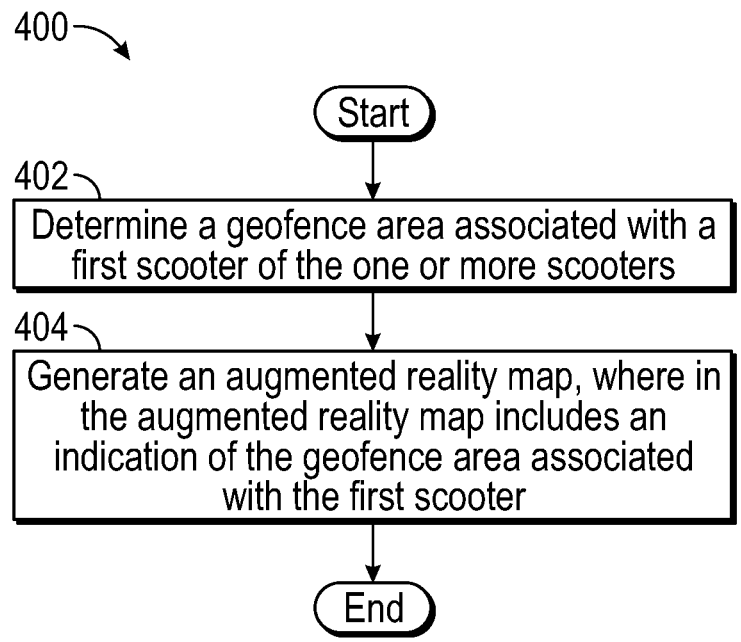
FIG. 4 depicts a flowchart of an example method in accordance with one or more example embodiments of the disclosure.

FIG. 4 is a flowchart of an example method of the present disclosure. In some embodiments, the method includes a step 402 of determining a geofence area associated with a first scooter of the one or more scooters.

In some embodiments, the method includes a step 404 of generating an augmented reality map, wherein the augmented reality map includes an indication of the geofence area associated with the first scooter.

Figure 5:
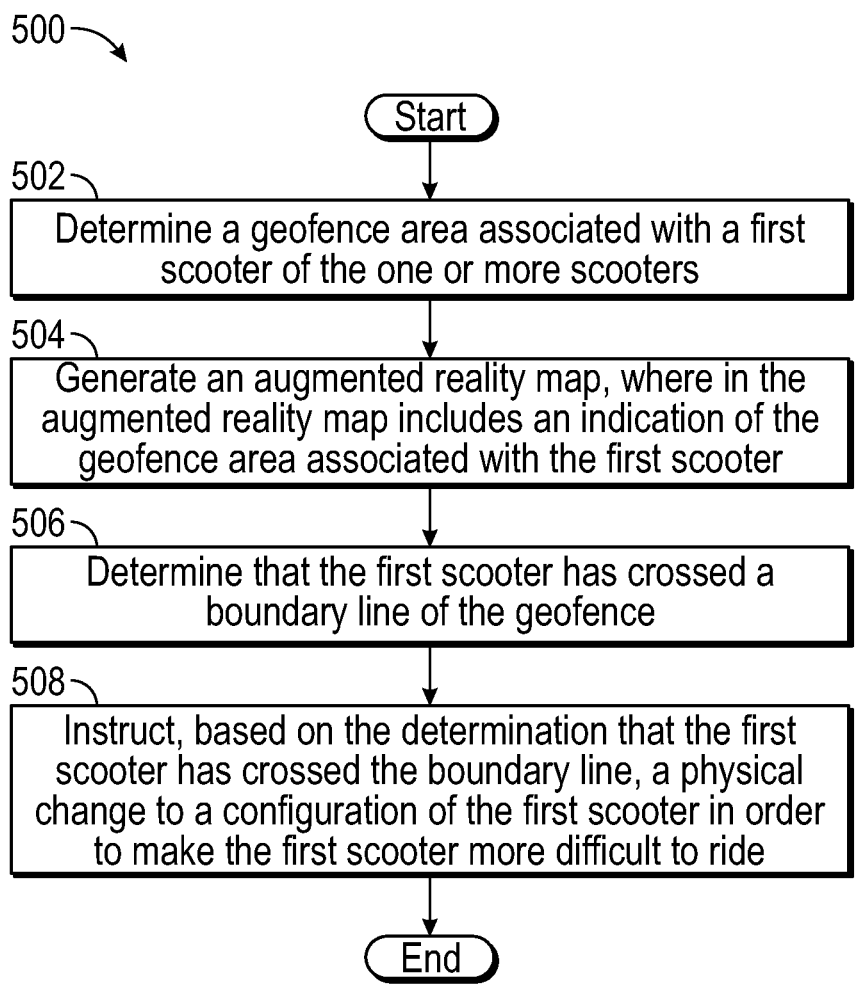
FIG. 5 depicts a flowchart of an example method in accordance with one or more example embodiments of the disclosure.

FIG. 5 is a flowchart of an example method of the present disclosure. In some embodiments, the method includes a step 502 of determining a geofence area associated with a first scooter of the one or more scooters.

In some embodiments, the method includes a step 504 of generate an augmented reality map, wherein the augmented reality map includes an indication of the geofence area associated with the first scooter.

In some embodiments, the method includes a step 506 of determining that the first scooter has exited the geofence area.

In some embodiments, the method includes a step 508 of instructing, based on the determination that the first scooter has exited the geofence area, a physical change to a configuration of the first scooter in order to make the first scooter more difficult to ride.

FIG. 6 depicts an example augmented reality map 602. The example augmented reality map 602 may be presented on the user mobile device 210, for example, and may comprise a first display 604 and a second display 606. The first display 604 may present a street view of the geofence area 608 in which the scooter 200 is allowed to operate. The first display 604 may also display the boundary line 610 when it is in visible range on the street view 608. The second display 606 may present a map view of the geofence area 608 in which the scooter 200 is allowed to operate. The second display 606 may display the boundary line 610 from a different perspective. The second display 606 may also display an area beyond the boundary line 610 where the scooter is not allowed to operate. Although two different displays are presented in FIG. 6, any number of displays may be included in any number of configurations. For example, in some embodiments, only the street view 608 or only the map view 612 may be displayed.

Figure 7:
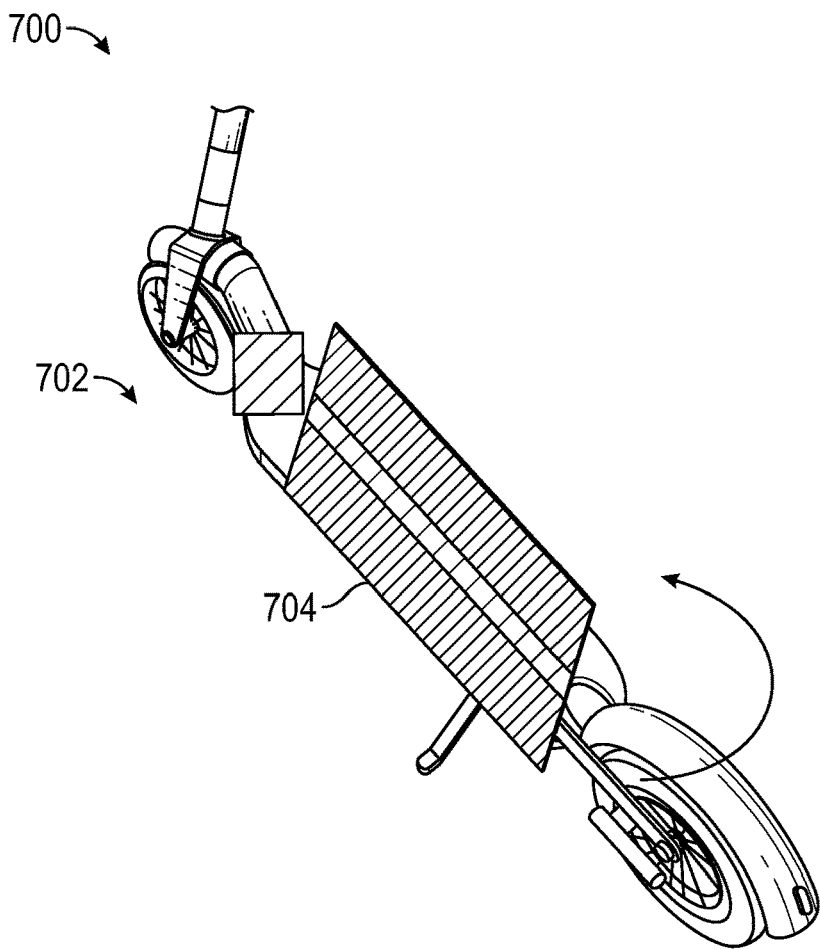
FIG. 7 depicts an example of a physical change made to a scooter in accordance with one or more example embodiments of the disclosure.

FIG. 7 depicts an example of a physical change made to a scooter 702 (which may be the same as scooter 200). As shown in FIG. 7, platform 704 (which may be the same as platform 202 in scooter 200) has been tilted to make the scooter 703 more difficult for a user to ride.

FIG. 8 depicts an example of a scooter 200 associated with multiple geofence areas. In some embodiments, a scooter 200 may be associated with more than one geofence areas. For example, scooter 200 may be associated with first smaller geofence area 802 surrounded by a second larger geofence area 806. The first smaller geofence area 802 may include a first boundary line 804 and the second larger geofence area 806 may include a second boundary line 808. The scooter 200 may be allowed to only operate within the first smaller geofence area 802, and certain actions described herein may be triggered when the scooter 200 exits the first smaller geofence area 802. In some instances, the same actions may be enhanced (for example, the resistance provided by the scooter may be increased at a larger rate) or other actions may also be triggered once the scooter 200 exits the second larger geofence area 806. In some embodiments, any number of geofence areas of any varying shape and/or size may be associated with a scooter 200.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system for managing one or more scooters, the system comprising:
   a processor; and
   memory storing computer-executable instructions, that when executed by the processor, cause the processor to:
   determine a geofence area associated with a first scooter of the one or more scooters;
   determine that the first scooter has exited the geofence area; and
   instruct, based on the determination that the first scooter has exited the geofence area, a physical change to a configuration of the first scooter, wherein the physical change to the configuration of the first scooter comprises a tilt in a platform of the first scooter.

2. The system of claim 1, wherein the computer-executable instructions further cause the processor to:
   generate an augmented reality map, wherein the augmented reality map includes an indication of the geofence area associated with the first scooter, wherein the augmented reality map is displayed on a mobile device in communication with the first scooter.

3. The system of claim 2, wherein the computer-executable instructions further cause the processor to:
   determine that the first scooter has exited the geofence area of the geofence; and
   determine, based on the determination that the first scooter has exited the geofence area, an optimal return route to the geofence area associated with the first scooter; and
   display, on the augmented reality map, the optimal return route.

4. The system of claim 1, wherein the computer-executable instructions further cause the processor to:
   determine that the first scooter has exited the geofence area; and
   gradually reduce, based on the determination that the first scooter has exited the geofence area, a level of propulsion assistance provided by the first scooter over time at a first rate.

5. The system of claim 4, wherein the computer-executable instructions further cause the processor to:
   gradually increase, based on the determination that the first scooter has exited the geofence area, an amount of resistance provided by the first scooter over time at a second rate.

6. The system of claim 5, wherein at least one of the first rate and the second rate is dynamic and changes depending on a direction of travel of the first scooter.

7. The system of claim 1, wherein the computer-executable instructions further cause the processor to:
   determine that the first scooter has exited the geofence area of the geofence; and
   generate, based on the determination that the first scooter has exited the geofence area, an alert, wherein the alert comprises at least one of: an audible warning, a message on a display screen, a mobile device push notification, or an audible alarm.

8. A scooter management method comprising:
   determining, by a processor, a geofence area associated with a first scooter;
   determining, by the processor, that the first scooter has exited the geofence area of the geofence; and
   instructing, by the processor and based on the determination that the first scooter has exited the geofence area, a physical change to a configuration of the first scooter in order to make the first scooter more difficult to ride, wherein the physical change to the configuration of the first scooter comprises a tilt in a platform of the first scooter.

9. The method of claim 8, further comprising:
   determining that the first scooter has exited the geofence area of the geofence; and
   gradually reducing, based on the determination that the first scooter has exited the geofence area, a level of propulsion assistance provided by the first scooter over time at a first rate.

10. The method of claim 9, further comprising:
    gradually increasing, based on the determination that the first scooter has exited the geofence area, an amount of resistance provided by the first scooter over time at a second rate.

11. The method of claim 10, wherein at least one of the first rate and the second rate is dynamic and changes depending on a direction of travel of the first scooter.

12. The method of claim 8, further comprising:
    generating, based on the determination that the first scooter has exited the geofence area, an alert, wherein the alert comprises at least one of: an audible warning, a message on a display screen, a mobile device push notification, or an audible alarm.

13. The method of claim 8, further comprising:
  determining, based on the determination that the first scooter has exited the geofence area, an optimal return route to the geofence area associated with the first scooter; and
  displaying, on an augmented reality map, the optimal return route.

14. A system for managing one or more scooters, the system comprising:
  a processor; and
  memory storing computer-executable instructions, that when executed by the processor, cause the processor to:
  determine a geofence area associated with a first scooter of the one or more scooters;
  determine that the first scooter has exited the geofence area of the geofence; and
  instruct, based on the determination that the first scooter has exited the geofence area, a physical change to a configuration of the first scooter in order to make the first scooter more difficult to ride, wherein the physical change to the configuration of the first scooter comprises a tilt in a platform of the first scooter.

15. The system of claim 14, wherein the computer-executable instructions further cause the processor to:
  determine that the first scooter has exited the geofence area of the geofence; and
  gradually reduce, based on the determination that the first scooter has exited the geofence area a level of propulsion assistance provided by the first scooter over time at a first rate.

16. The system of claim 14, wherein the computer-executable instructions further cause the processor to:
  determine that the first scooter has exited the geofence area of the geofence; and
  gradually increase, based on the determination that the first scooter has exited the geofence area, an amount of resistance provided by the first scooter over time at a second rate.

* * * * *